United States Patent
Thomsen et al.

(10) Patent No.: US 6,880,438 B2
(45) Date of Patent: Apr. 19, 2005

(54) METHOD AND SYSTEM FOR CUTTING PUZZLE CUT PETALS IN BELTS

(75) Inventors: Karl V. Thomsen, Ontario, NY (US); Charles J. Urso, III, Webster, NY (US); James F. Dildine, Jr., Williamson, NY (US); Boris W. Haritonoff, Geneseo, NY (US); David C. Gruber, Rochester, NY (US); Steven C. Brown, Henrietta, NY (US)

(73) Assignee: Xerox Corporation, Stamford, CT (US)

( * ) Notice: Subject to any disclaimer, the term of this patent is extended or adjusted under 35 U.S.C. 154(b) by 72 days.

(21) Appl. No.: 10/649,979

(22) Filed: Aug. 26, 2003

(65) Prior Publication Data

US 2004/0206219 A1 Oct. 21, 2004

Related U.S. Application Data

(62) Division of application No. 10/093,911, filed on Mar. 7, 2002, now Pat. No. 6,681,671.

(51) Int. Cl.$^7$ ................................................ B26D 5/00
(52) U.S. Cl. .............................. 83/35; 83/367; 83/404; 83/412
(58) Field of Search ............................ 83/35, 401, 402, 83/404.2, 404.3, 404, 405, 409, 412, 414, 415, 418, 361, 364, 365, 367, 437.1; 414/737, 730; 269/21

(56) References Cited

U.S. PATENT DOCUMENTS

| | | | | |
|---|---|---|---|---|
| 3,830,121 A | * | 8/1974 | Makeev et al. | 83/415 |
| 4,444,492 A | * | 4/1984 | Lee | 269/21 |
| 4,697,448 A | * | 10/1987 | Stevens et al. | 414/730 |
| 4,804,173 A | * | 2/1989 | Pol et al. | 414/737 |
| 4,878,985 A | * | 11/1989 | Thomsen et al. | 156/459 |
| 4,968,369 A | * | 11/1990 | Darcy et al. | 156/217 |
| 5,036,736 A | * | 8/1991 | Hillock et al. | 83/23 |
| 5,487,707 A | | 1/1996 | Sharf et al. | 474/253 |
| 5,514,436 A | | 5/1996 | Schlueter, Jr. et al. | 428/57 |
| 6,006,638 A | * | 12/1999 | Eltringham | 83/402 |
| 6,290,274 B1 | * | 9/2001 | Montoya | 269/21 |
| 6,311,595 B1 | * | 11/2001 | Schlueter et al. | 83/145 |
| 6,318,223 B1 | * | 11/2001 | Yu et al. | 83/13 |
| 6,457,392 B1 | * | 10/2002 | Schlueter et al. | 83/685 |

FOREIGN PATENT DOCUMENTS

GB 2331951 * 6/1999

* cited by examiner

Primary Examiner—Stephen Choi
(74) Attorney, Agent, or Firm—Lloyd E. Bean, II

(57) ABSTRACT

A method for cutting belt material to accurate dimensions and for forming the mating edges of a puzzle cut joint for joining the ends of the belt material to form a continuous belt for use in a document processing application. The belt material is maintained in accurate registration a punch press by optical sensors at each station. A vacuum pickup is constructed to move the belt material from a precision cutter to a punch press and maintains the material in tensioned condition to facilitate accurate operation of the punch press.

12 Claims, 12 Drawing Sheets

METHOD AND SYSTEM FOR CUTTING PUZZLE CUT PETALS IN BELTS

CROSS-REFERENCE TO RELATED APPLICATIONS

This is a divisional of U.S. application Ser. No. 10/093,911 filed Mar. 7, 2002, now U.S. Pat. No. 6,681,671 by the same inventors, and claims priority therefrom. This divisional application is being filed in response to a restriction requirement in that prior application.

FIELD OF THE INVENTION

This invention relates to electrophotographic printing machines. Specifically, this invention relates to electrophotographic printing machines having seamed intermediate transfer belts. These belts are made from flat sheets formed as a continuous belt using a puzzle cut joint.

BACKGROUND OF THE INVENTION

Electrophotographic printing is a well-known and commonly used method of copying or printing documents. Electrophotographic printing is performed by exposing a light image representation of a desired document onto a substantially uniformly charged photoreceptor. In response to that light image the photoreceptor discharges, creating an electrostatic latent image of the desired document on the photoreceptor's surface. Toner is then deposited onto that latent image, forming a toner image. The toner image is then transferred from the photoreceptor onto a receiving substrate such as a sheet of paper. The transferred toner image is then fused with the substrate, usually using heat and/or pressure. The surface of the photoreceptor is then cleaned of residual developing material and recharged in preparation for the production of another image.

The foregoing generally describes black and white electrophotographic printing machines. Electrophotographic printing can also produce color images by repeating the above process for each color of toner that is used to make the color image. For example, the photoreceptive surface may be exposed to a light image that represents a first color, say black. The resultant electrostatic latent image can then be developed with black toner particles to produce a black toner layer that is subsequently transferred onto a receiving substrate. The process can then be repeated for a second color, say yellow, then for a third color, say magenta, and finally for a fourth color, say cyan. When the toner layers are placed in superimposed registration the desired composite color toner image is formed and fused on the receiving substrate.

The color printing process described above superimposes the color toner layers directly onto a substrate. Other electrophotographic printing systems use intermediate transfer belts. In such systems successive toner layers are electrostatically transferred in superimposed registration from the photoreceptor onto an intermediate transfer belt. Only after the composite toner image is formed on the intermediate transfer belt is that image transferred and fused onto the substrate. Indeed, some electrophotographic printing systems use multiple intermediate transfer belts, transferring toner to and from the belts as required to fulfill the requirements of the machine's overall architecture.

In operation, an intermediate transfer belt is brought into contact with a toner image-bearing member such as a photoreceptor belt. In the contact zone an electrostatic field generating device such as a corotron, a bias transfer roller, a bias blade, or the like creates electrostatic fields that transfer toner onto the intermediate transfer belt. Subsequently, the intermediate transfer belt is brought into contact with a receiver. A similar electrostatic field generating devices then transfers toner from the intermediate transfer belt to the receiver. Depending on the system, a receiver can be another intermediate transfer member or a substrate onto which the toner will eventually be fixed. In either case the control of the electrostatic fields in and near the transfer zone is a significant factor in toner transfer.

Intermediate transfer belts often take the form of seamed belts fabricated by fastening two ends of a web material together, such as by welding, sewing, wiring, stapling, or gluing. While seamless intermediate transfer belts are possible, they require manufacturing processes that make them much more expensive than similar seamed intermediate transfer belts. This is particularly true when the intermediate transfer belt is long. While seamed intermediate transfer belts are relatively low in cost, the seam introduces a discontinuity that interferes with the electrical, thermal, and mechanical properties of the belt. While it is possible to synchronize a printer's operation with the motion of the intermediate transfer belt such that toner is not electrostatically transferred onto the seam, such synchronization adds to the printer's expense and complexity, resulting in loss of productivity. Additionally, since high speed electrophotographic printers typically produce images on paper sheets that are cut from a paper "web," if the seam is avoided the resulting unused portion of the paper web must be cut-out, producing waste. Furthermore, even with synchronization the mechanical problems related to the discontinuity, such as excessive cleaner wear and mechanical vibrations, still exist.

Acceptable intermediate transfer belts require sufficient seam strength to achieve a desired operating life. While the desired operating life depends on the specific application, typically it will be at least 100,000 operating cycles, and more preferably 1,000,000 cycles. Considering that a seamed intermediate transfer belt suffers mechanical stresses from belt tension, traveling over rollers, moving through transfer nips, and passing through cleaning systems, achieving such a long operating life is not trivial. Thus the conflicting constraints of long life and limited topographical size at the seam places a premium on adhesive strength and good seam construction.

A prior art "puzzle cut" approach to seamed intermediate transfer belts significantly reduces mechanical problems by producing an improved mechanical seam.

U.S. Pat. No. 5,514,436, issued May 7, 1996, entitled, "Puzzle Cut Seamed Belt;" U.S. Pat. No. 5,554,193, entitled "Endless Seamed Belt with Low Thickness Differential Between the Seam and the Rest of the Belt," and U.S. Pat. No. 5,487,707, issued Jan. 30, 1996, entitled "Puzzle Cut Seamed Belt With Bonding Between Adjacent Surface By UV Cured Adhesive" teach the puzzle cut approach. While puzzle cuts reduce mechanical problems there remains other difficulties with transferring toner onto and off of a seam of a seamed intermediate transfer belt.

The process of cutting the petals in the belt material to form the puzzle cut joints presents a challenge to those attempting full automation. There is a continuous need through out the cutting process to maintain close tolerances. These tolerances require high precision in the handling of the belt material and the continuous registration of the belt material with the cutting and handling apparatus. In addition this must be accomplished while maintaining the belt material free of contamination.

It is a purpose of the system of this application to provide an automated system and process for cutting the belt material in preparation for joining the ends of the belt material into a continuous belt. It is another purpose of this system to accomplish this while minimizing contamination and damage. It is another purpose of the system of this application to maintain accurate positioning of the belt continuously through the cutting process.

SUMMARY OF THE DISCLOSURE

The system of this application provides a means of fabricating a flat sheet of belt material into a blank for use in forming a continuous belt. Such belts are used in various functions within a printing system, as discussed in the above background section. A two stage cutting system is constructed having a first work station which is designed to cut the belt blank to predetermined dimensions and a second station which is designed to accurately punch the petal configuration of the puzzle cut in each end of the blank.

The first station is comprised of a cutting blade mounted on an x-y support for computer controlled motion over a cutting table. The puzzle cut station is constructed having a left and right die set mounted over a punch table on which the blank is clamped for performing a first punch operation by one of the die sets on one end of the blank and then moved a predetermined distance to the other punch/die set for a repeat punch operation on the other end. Within the punch station there are also left and right optical position sensors which align and register the blank with the die set prior to each die cut. A pick and place transport mechanism picks up the blank from the precision cutter station and moves it to one of the die sets of the punch station. Vacuum pickup bars are used to engage the blank and secure it in position and maintain the blank in a taut condition.

As a first step of the method of this application, a flat sheet of belt material is smoothed out and secured by vacuum on a cutting table in registration with a precision cutter. The sheet of belt material is registered in place on the cutting table and held by a vacuum. The material is cut into a blank to predetermined dimensions, with its width and rectangular shape being within close tolerances. The length is cut oversized to facilitate processing in the punch station.

After the cutting operation, the blank of belt material is engaged by the pick and place mechanism. The pick and place mechanism is moved over the blank with a slight clearance. Simultaneously the vacuum of the vacuum bars is applied while the vacuum of the cutting table is reversed. This insures a reliable and accurate release of the blank from the cutting table.

The blank is then removed from the table and placed in the punch station. Again to insure proper positioning and registration in the punch station, the pick and place mechanism maintains the blank in a flattened and taut condition as it is introduced into the punch station.

The blank is positioned on the work platform of the punch station in registration with one end of the punch by means of an optical monitor, which senses and registers a lengthwise edge of the blank. When one end is registered with the respective punch die set, the blank is clamped and punched. After one end is punched with the puzzle cut petals, the belt is released from the clamp and shifted a predetermined distance to the other punch die set by the pick and place mechanism to cut the mating petals. At each position, the location of the blank is monitored by an optical system to insure continuous alignment of the blank in the punch station. Left and right optical sensors insure the registration of a lengthwise edge with the die set. Limited x-y motion is provided by the vacuum bar supports to move the blank from one punch set to the other.

DESCRIPTION OF THE DRAWING

The system and method of this application are described in more detail below with reference to the attached drawing in which.

DETAILED DESCRIPTION OF THE SYSTEM OF THIS APPLICATION

Figure 7A:
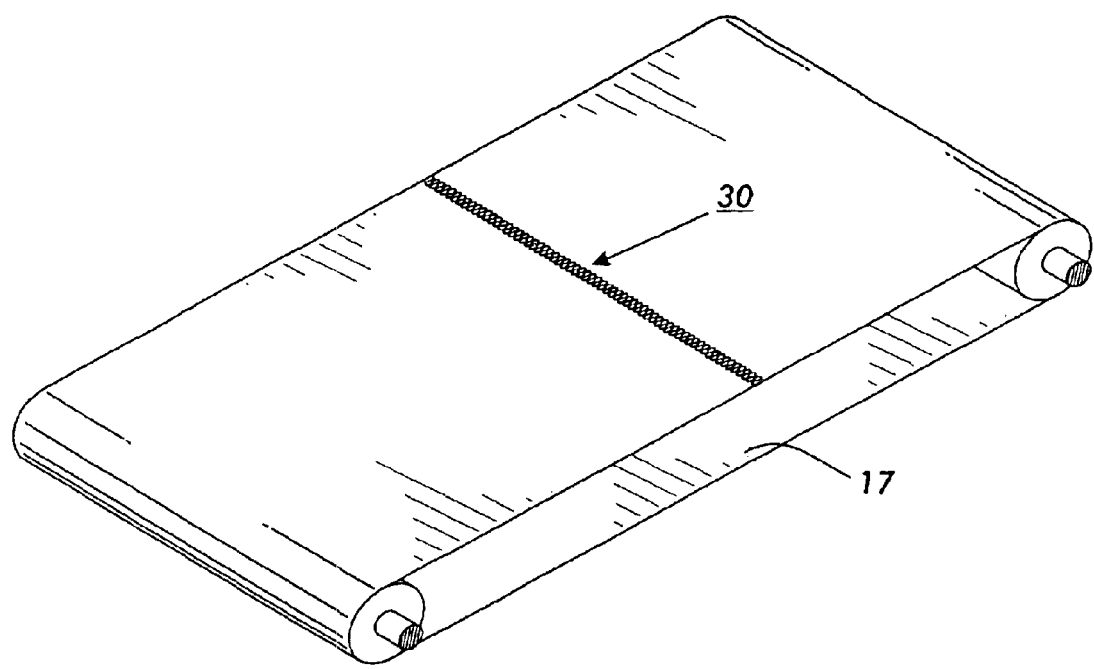
FIG. 7a is a perspective view of a continuous belt having a puzzle cut joint.
Figure 7B:
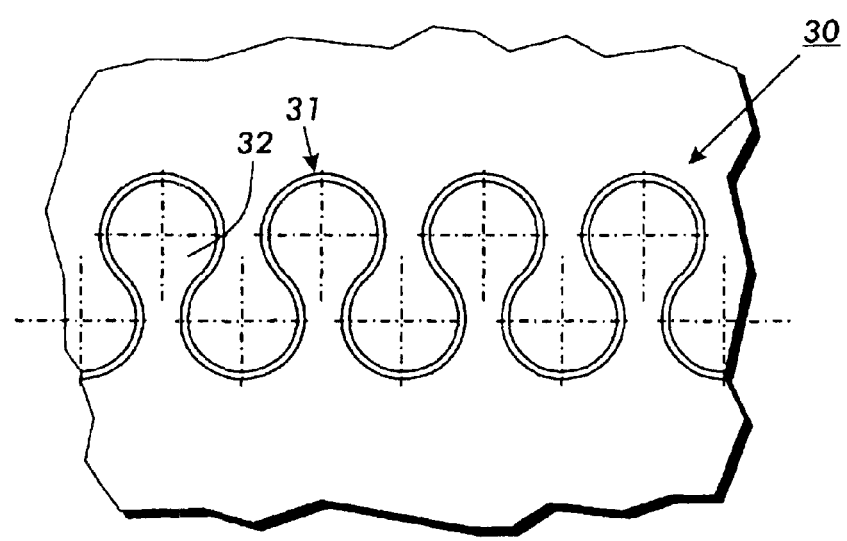
FIG. 7b s an enlarged view of a portion of the puzzle cut joint.

The system of this application consists of an assembly of three process stations, which are positioned adjacent to each other and are mutually controlled by a main computer controller 14. The stations comprise a precision cutter 1, a pick and place mechanism 2, and a punch station 3. Each of the stations 1–3 sequentially processes a belt material comprising a flat piece of belt material 17 having a length l and a width w. Since contamination of the belt surface is to be avoided, manual manipulation of the belt material 17 is minimized. In addition, because of the need for accurate t dimensioning of the belt blank, accurate positioning of the belt material must be maintained, Station 1 cuts the blank of belt material to predetermined dimensions. The width and rectangular shape of the blank are cut to close tolerances, while a limited amount of extra material is provided in the length to facilitate later processing. Station 2 is mainly a transport to move the blank 17 from station 1 to station 3, but it also must maintain the material in position and in a taut condition for accuracy and to avoid damage. Station 3 is a punch press, which uses a pair of die and punch sets to accurately make the puzzle cut at both ends of blank 17. An example of a puzzle cut joint is shown in FIGS. 7a and 7b.

Figure 1:
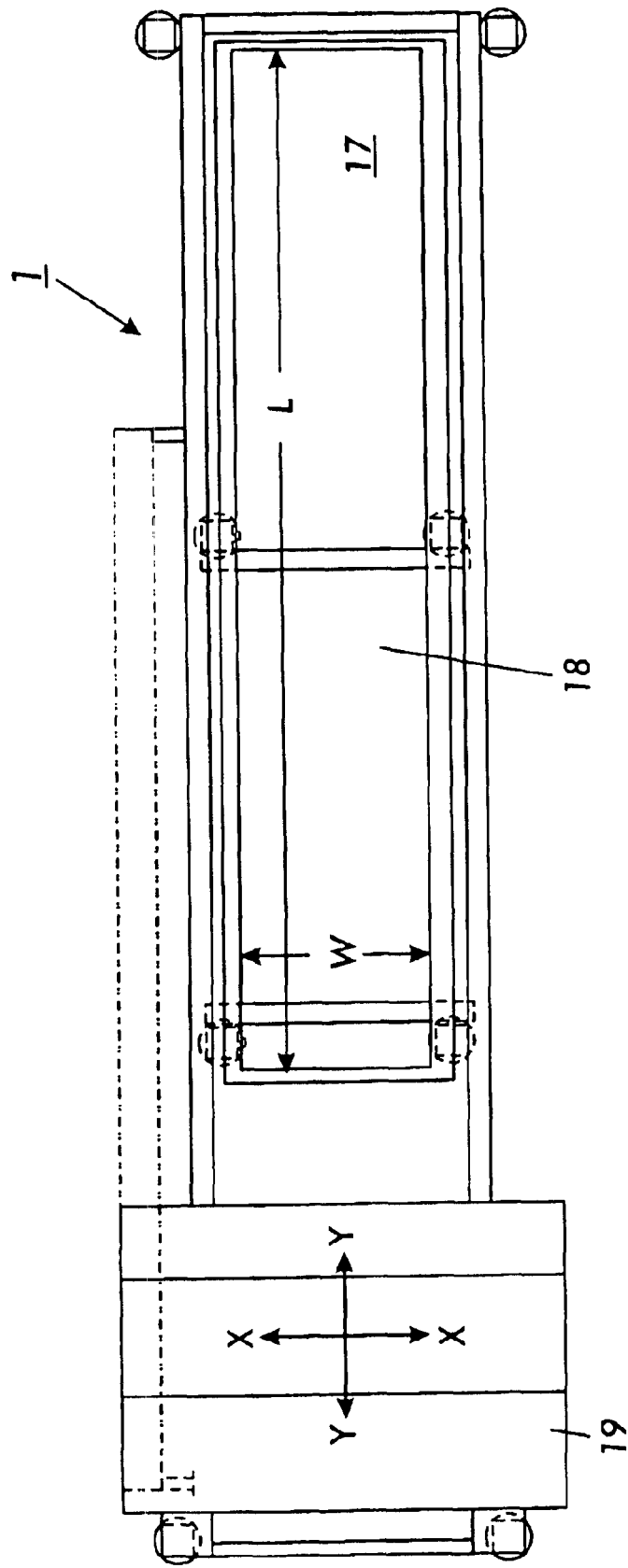
FIG. 1 is a top schematic view of the precision cutter station of the system of this application.
Figure 2:
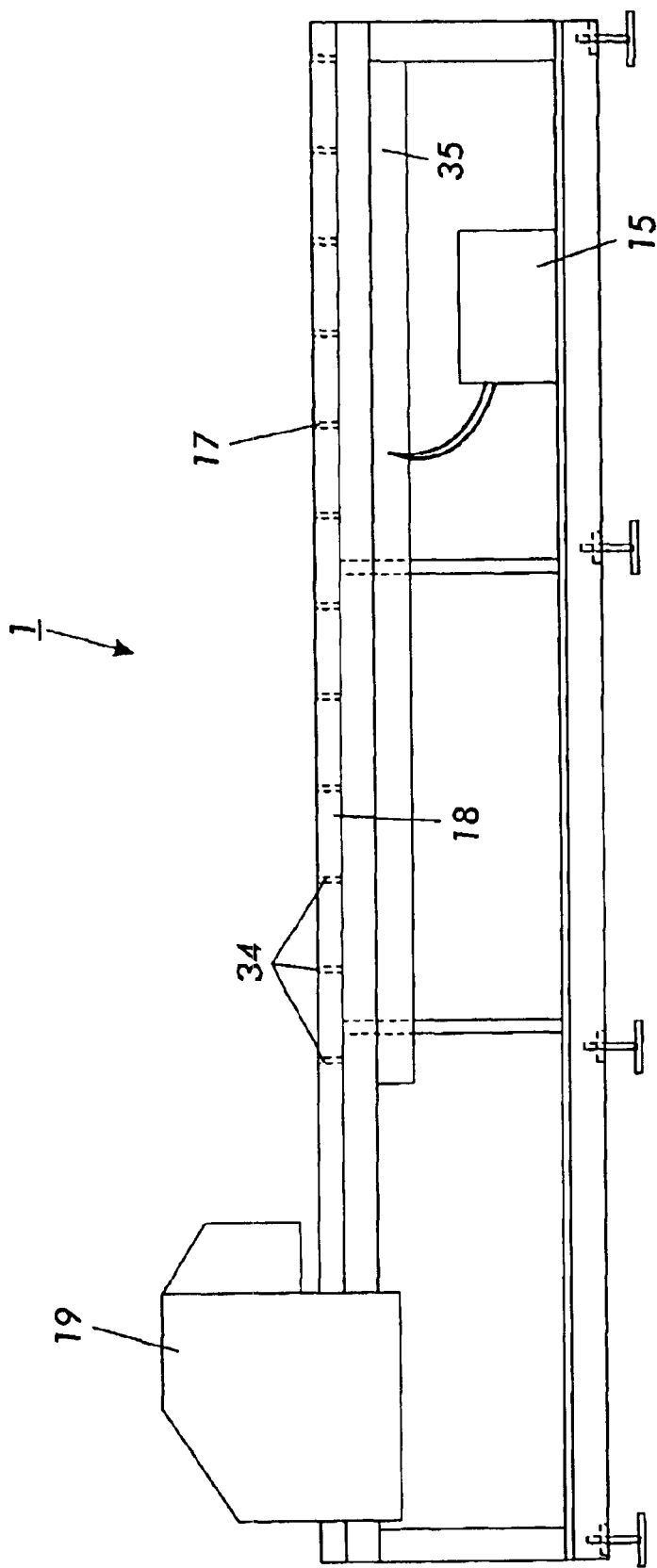
FIG. 2 is a front schematic view of the precision cutter station of the system of this application.
Figure 3:
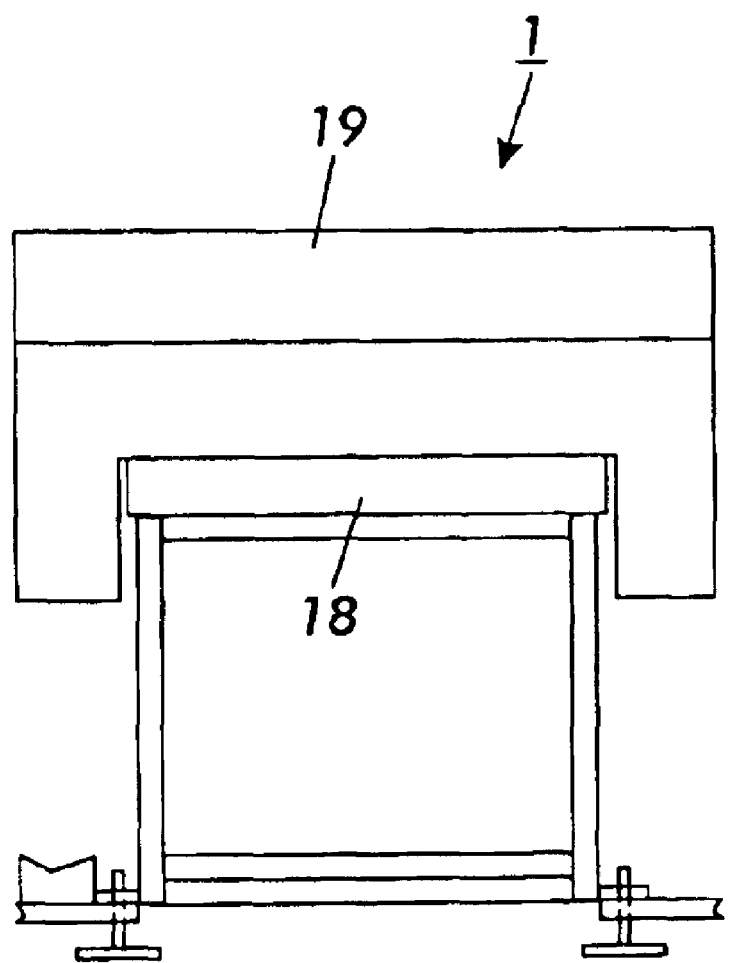
FIG. 3 is a side schematic view of the precision cutter station of the system of this application.
Figure 8:
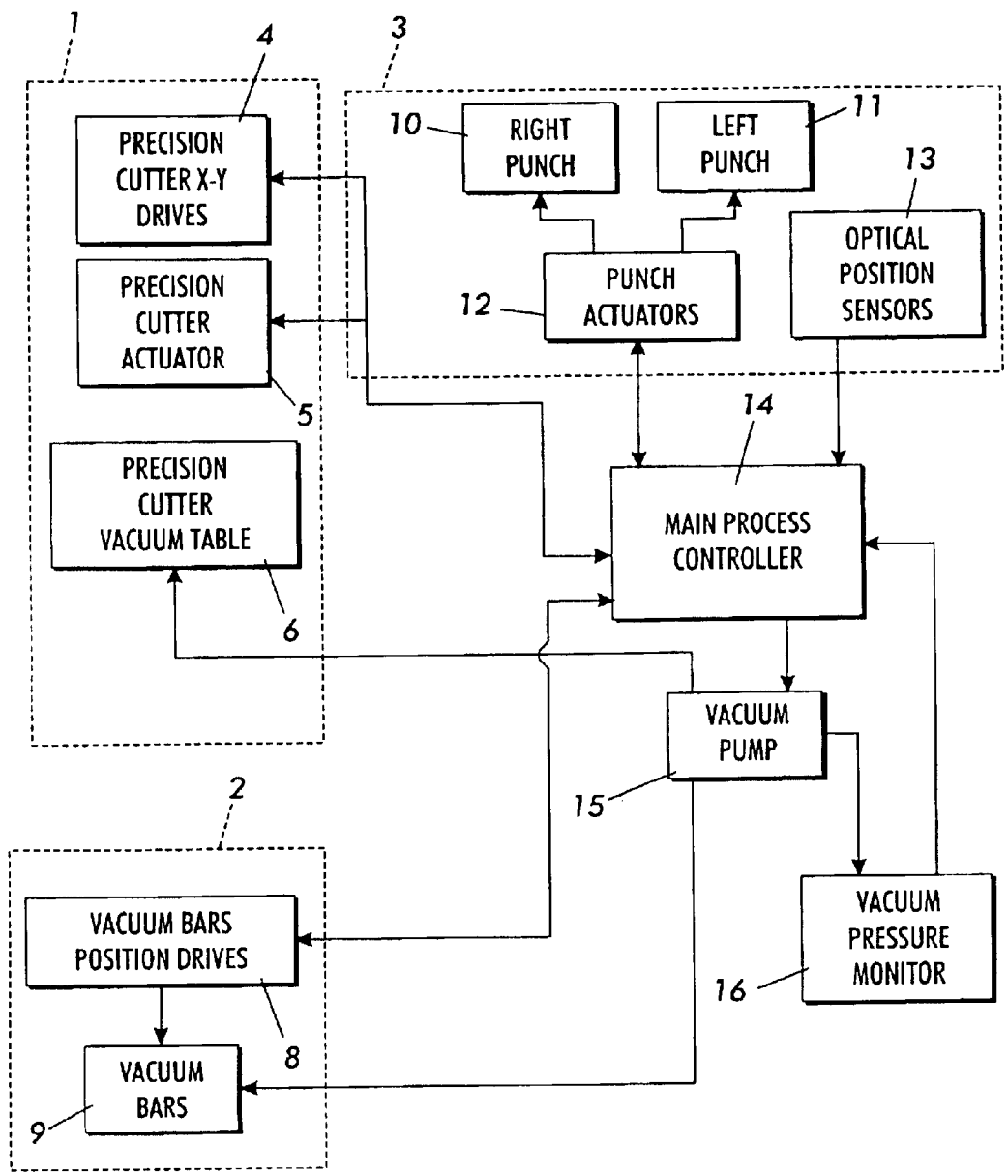
FIG. 8 is a block diagram of a control system used in the system of this application.
Figure 9:
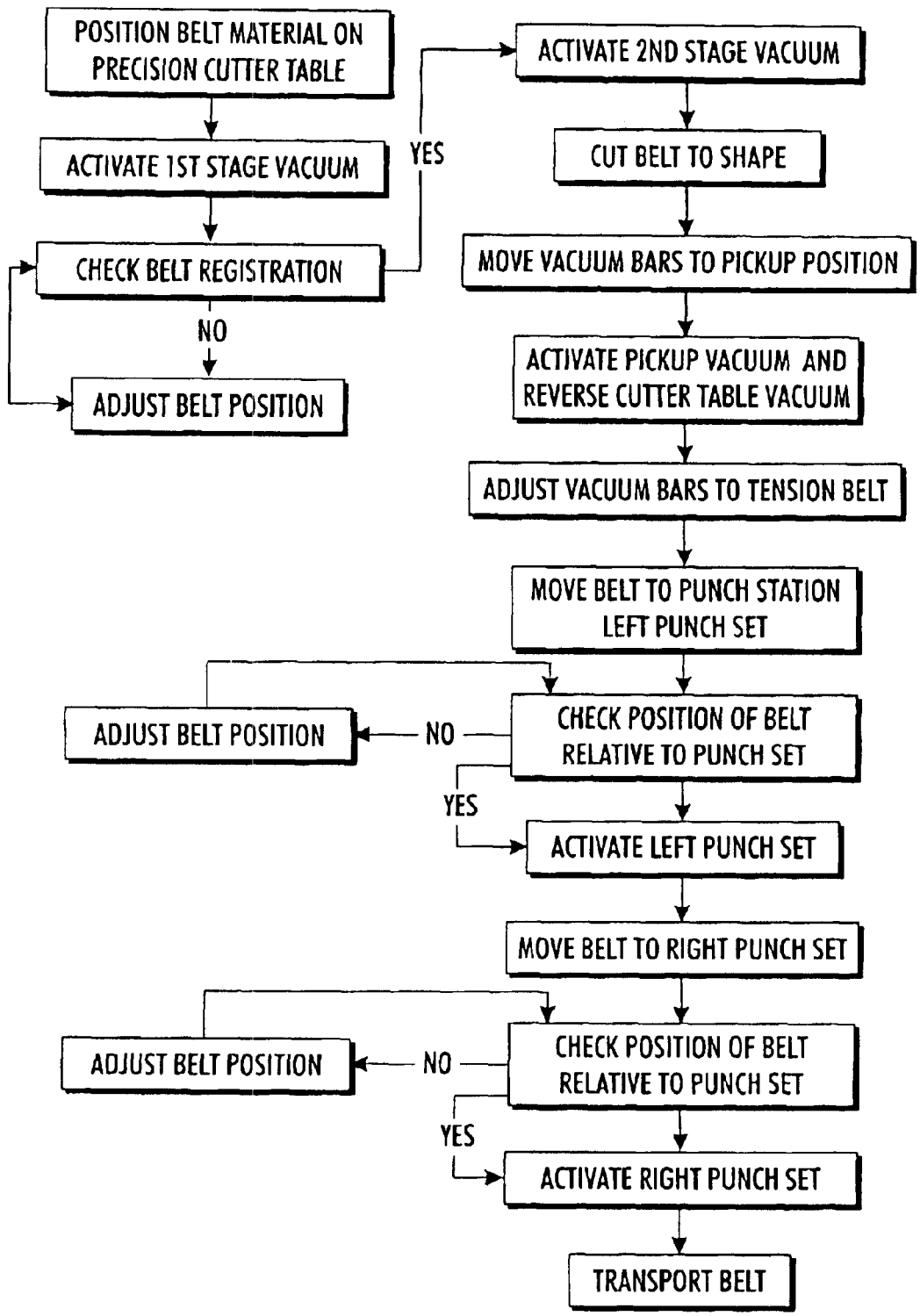
FIG. 9 is a block diagram showing the steps of the method of this application.

Precision cutter station 1, as shown in FIGS. 1–3 and the block diagram of FIG. 8, comprises the first work station of the system. As illustrated in FIG. 2, this station is constructed with a cutting table 6 that includes a vacuum hold down system 7. A static blade is mounted on a platform 19 that is moveable In controlled X-Y motions above cutter vacuum table 6. Although a static blade has been found to effectively perform the required cutting steps, a rotating blade could also be used. As shown in FIGS. 1–3, the platform 19 is mounted for longitudinal movement in the Y direction on table 6, while the cutter blade (not shown) is mounted for transverse movement on the platform 19 to provide the X movement. The motion of the cutter is provided by any appropriate computer controllable means, for example stepping motors. A vacuum hold down is constructed in the supporting surface of the table 18. The vacuum may be applied to the belt material 17 by means of a series of orifices 34 drilled in the supporting surface. A pump 15 is connected to the table 18 and is designed to both evacuate a plenum 33 in the table 18 and to provide pressurized air to the plenum 33. In this manner an appropriate releasing force may be applied to assist removal of the blank 17.

The cutter station 1 may be a commercially available stand-alone unit, such as the Blackman & White, Master Cut Model 2000. The computer control of the cutter station is integrated into the system of this application for common control.

Figure 10A:
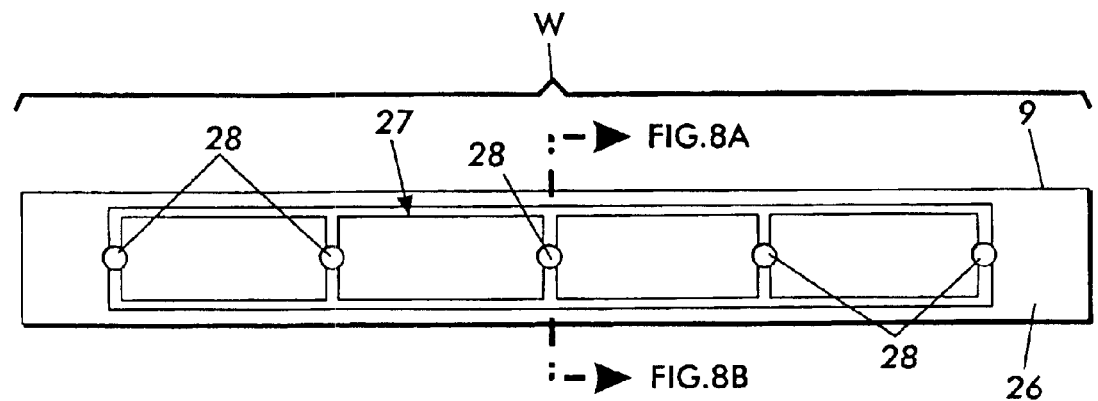
FIG. 10a is a bottom view of a vacuum bar used in the system of this application.
Figure 10B:
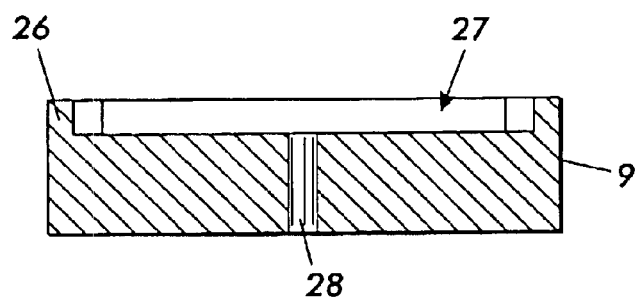
FIG. 10b is an enlarged sectional schematic view of the vacuum bar of FIG. 10a through section lines A—A.

Pick and place assembly 2 consists of multiple vacuum bars 9 connected to a source of vacuum that is applied under computer control. The bars 9 are elongated and span the width w of the blank 17. The lower surface 26 of the vacuum bars 9 forms an interface with the blank 17 which is of generally rectangular shape. Lower surface 26 is constructed with a pattern of slots 27 shaped as shown in FIGS. 10a and 10b. Vacuum is supplied to the slot pattern 27 through ports 28. Slot pattern 27 distributes the application of the vacuum evenly over Interface surface 26 to the blank 17 to provide a reliable and secure pickup tome in each of the vacuum bars 9.

Figure 6:
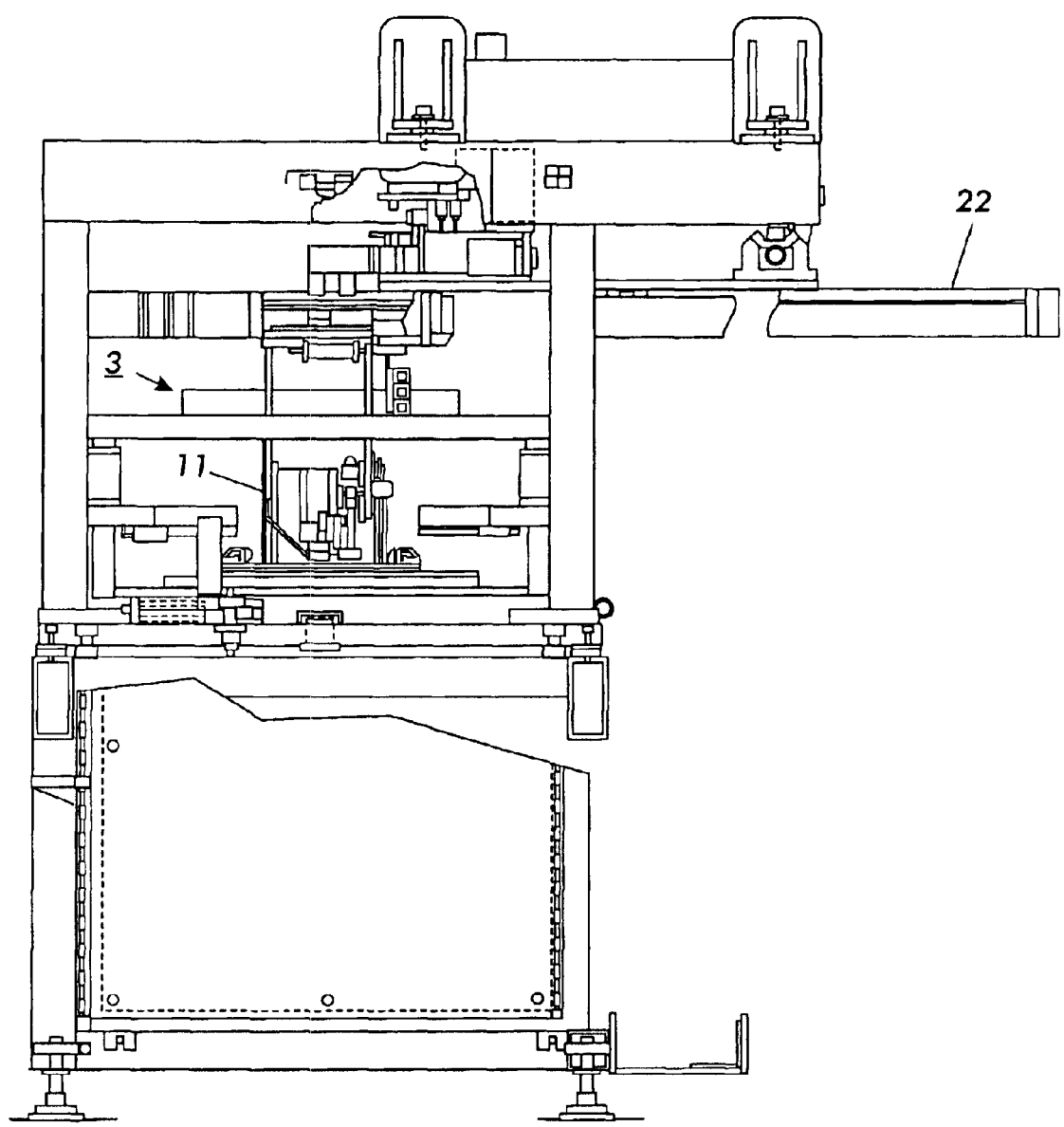
FIG. 6 is a side schematic view of the punch station and transport system of the system of this application.
Figure 11:
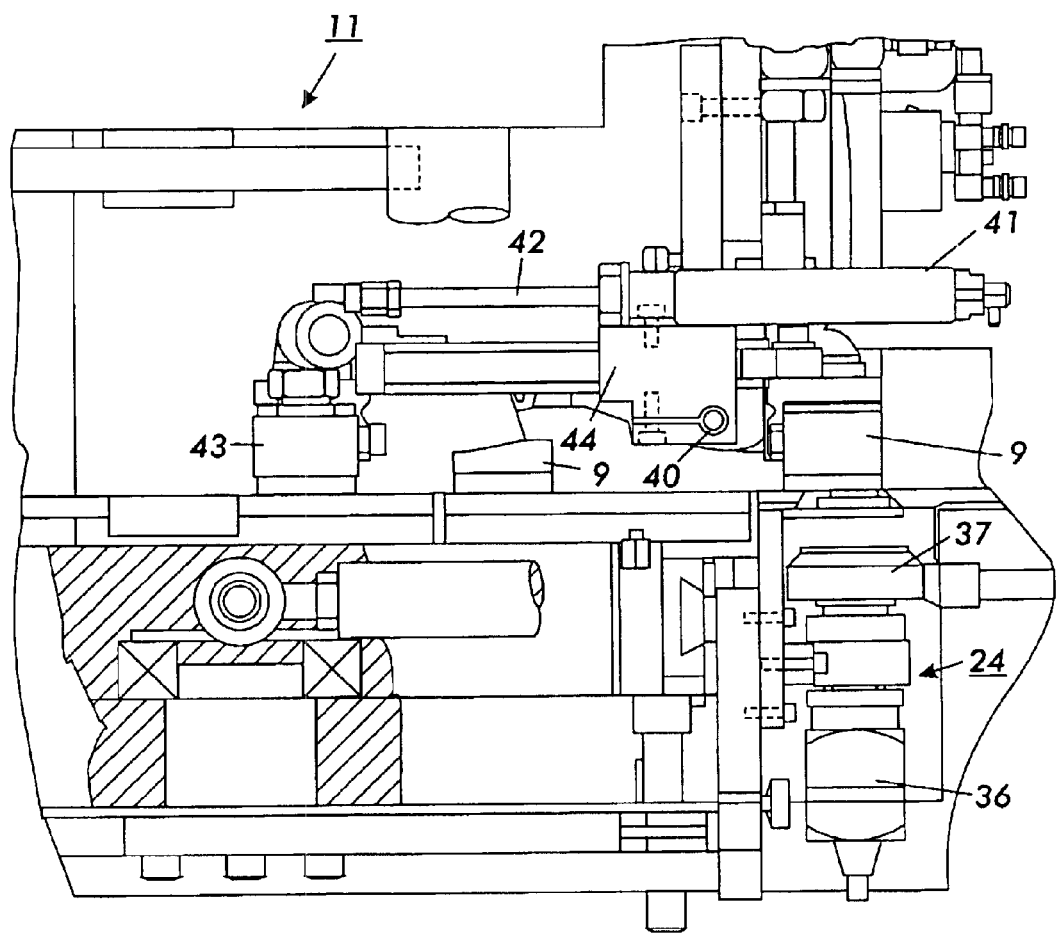
FIG. 11 is a side schematic view of the left punch station of the system of this application.

An array of three vacuum bars 9 are mounted on each of the arms 20 and extend over the blank 17 at a slight clearance in the pickup position. The vacuum bars 9 are displaced along the length of the arms 20 to apply a holding force to the blank 17 which is distributed over the length of the blank. Each of the arms 20 are supported by a hanging mount 21 that provide the connecting apparatus for the vacuum bars 9. Hanging mounts 21 are in turn slidably mounted on cantilever rails 22 that extend over the precision cutter station 1, as shown in FIG. 6. The hanging mounts 21 also provide movement transverse to the longitudinal axis of the rails 22 to allow movement of the blank 17 within the punch station 3. A pair of drives 25 are operatively connected to the hanging mounts 21 to move the vacuum bars along the rails 22 to and from the pick up position. This allows the movement of the cut blank 17 from the precision cutter station 1 to the punch station 3. The vacuum bars 9 are intended to engage blank 17 continuously after blank 17 is picked up from the cutting station. However, the outermost vacuum bar on either side will interfere with the operation of the respective punch set. To avoid this the outermost vacuum bar looses its vacuum and retracts out of the way of the punch set. The mechanism which accomplishes this is shown in FIG. 11. The outermost vacuum bar 43 is mounted on a bracket 44. Bracket 44 may be pivoted about axis 40 by cylinder 41. Cylinder 41 is operatively connected to the vacuum bar 43 by actuating shaft 42.

The punch station 3 is constructed with a pair of punch presses consisting of right press 10 and left press 11 which typically consist of a punch and die set. The punch elements cooperate to cut a pattern according to the shape of the die. In cutting the puzzle joint pattern 30 shown in FIGS. 7a and 7b, a die having the shape of the petal shaped openings 31 and petals 32 would be used. Such presses are well known in the art and may be driven by hydraulically or electrically powered actuators 12 by computer controller 14.

Figure 12:
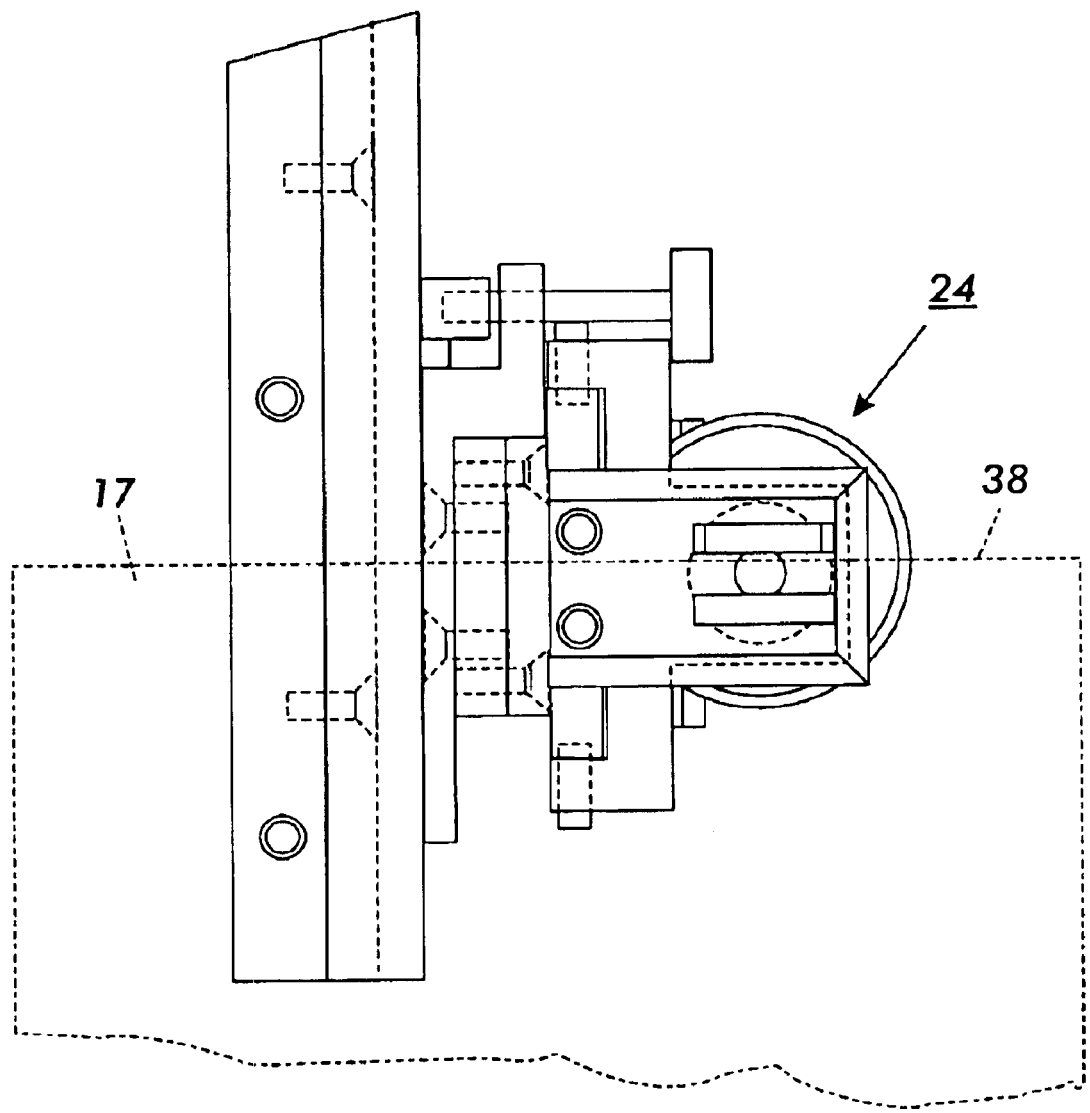
FIG. 12 is a top schematic view of the sensor in the left punch station of FIG. 11.

Accuracy of the puzzle cut joint depends on a precise alignment of the blank 17 with respect to the punch/die sets 10 and 11. This is accomplished by optical monitor 13 which consists of optical sensors 23 and 24 operatively positioned adjacent to each of the punch sets to sense the location of the lengthwise edge of the blank 17 as it is moved into the die press 10 or 11 by pick and place assembly 2. The sensors 23 and 24 are identical elements, one of which is shown in FIGS. 11 and 12. A digital camera 36 is used which may consist of a charge coupled device mounted under the punch table with line of sight access to the edge 38 of blank 17, as shown in FIG. 12. An optical element 37 is coupled to the camera and consists of a light source and lens (not shown). Cameras of this type are commercially available, for example. model CV050 from KEYENCE CORPORATION of Woodcliff Lake, N.J.

The sensors will sense the position of the blank for proper registration and signal the process controller 14. Movement of the pick and place assembly is controlled by process controller 14. In order to move the blank 17 from one punch set to the other, hanging mounts 21 are constructed to move in tandem in a direction transverse to the longitudinal axis of the arms 20. Controller 14 will cause the pick and place mechanism 2 to move the blank 17 a predetermined distance from its position within the first punch set to the second punch set for cutting of the remaining end of the blank. The final length dimension is cut in the punch station 3.

In operation, a work piece comprising rough cut blank material, is smoothed out and secured by vacuum on cutting table 18 in registration with a precision cutter mounted on platform 19. Platform 19 is mounted for computer controlled movement, in x and y directions, over the cutting table 18. The sheet of blank material 17 is registered in place on the cutting table 18 and held by a vacuum supplied to plenum 33 by pump 15. The vacuum can be a two step vacuum, namely a first level in which the material can be flattened and adjusted in position and a second level in which the material is tightly secured to the table 18 for cutting. The material 17 is cut into a blank having specified dimensions in which the width and rectangular shape of the blank 17 are within close tolerances. Extra material is provided in the length of the blank to facilitate handling in the punch station 3. These close tolerances insure that the nodes and petals of the joint are accurately aligned for proper mating of the ends of the belt 17 in a continuous blank configuration. Such accurate dimensioning of the blank 17, is needed so that the finished belt will track properly during operation.

Figure 4:
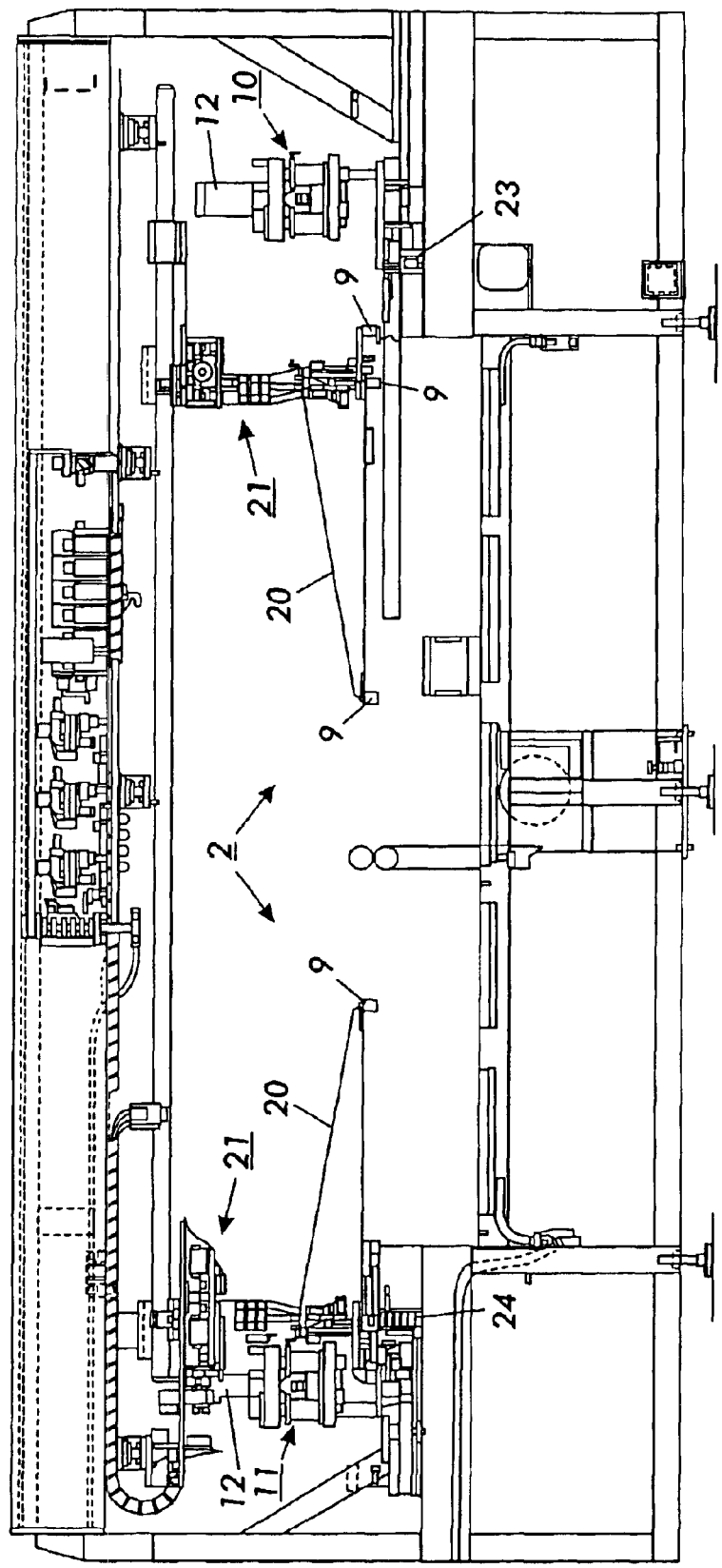
FIG. 4 is a front schematic view of the transport system of the system of this application.
Figure 5:
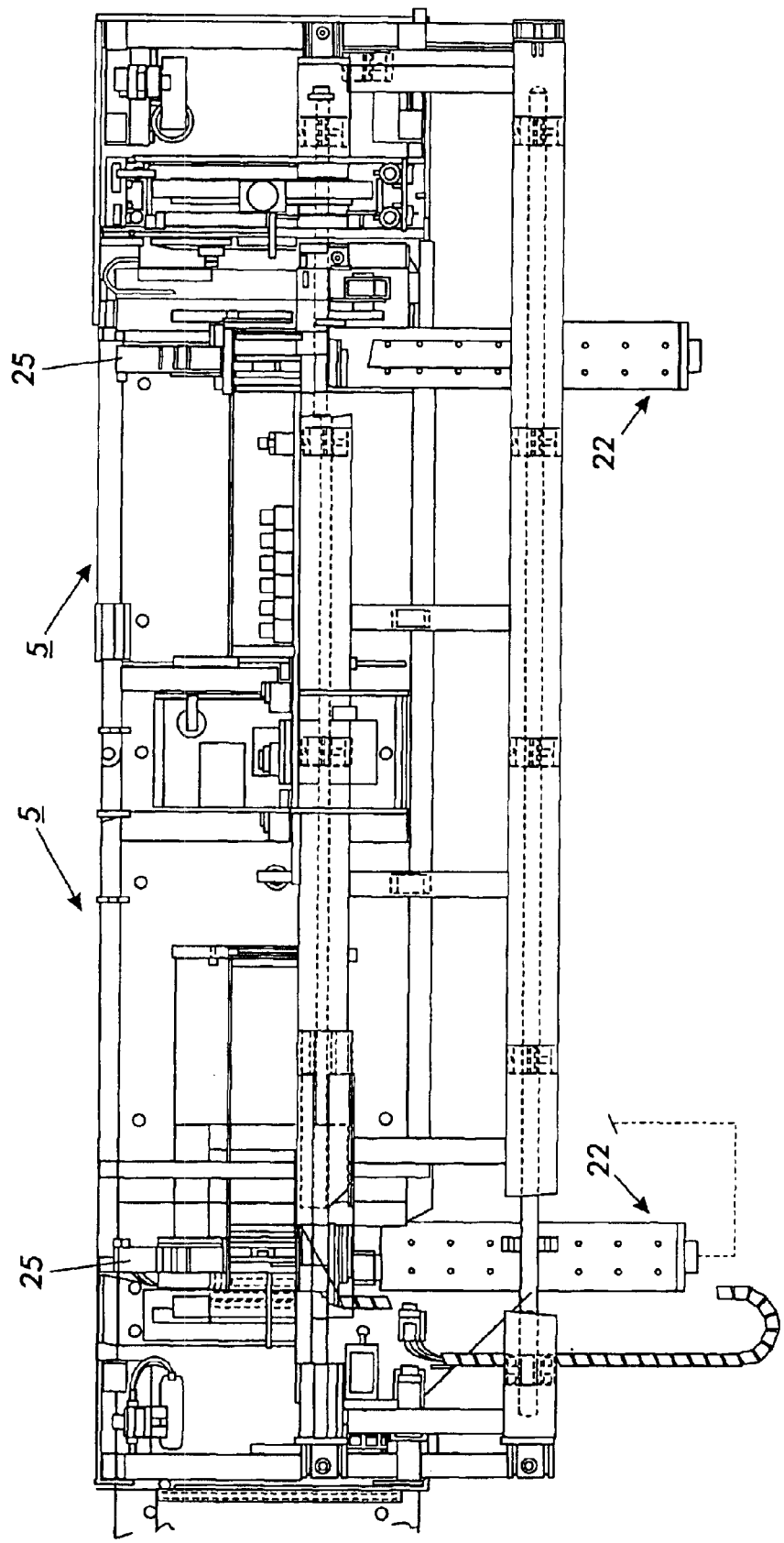
FIG. 5 is a top schematic view of the punch station and transport system of the system of this application.

Referring to FIGS. 4–6, the precision cutter station 1 is positioned adjacent to the puzzle cut punch station 3. After the cutting operation, the blank 17 of blank material is engaged by pick and place mechanism 2. Cantilevered arms 20 slide along rails 22, on hanging mounts 21, from a position in which they extend over the cutting station 1 to a position where they extend into the punch station 3. Vacuum bars 9 extend the width of the blank 17 and apply a suction in a distributed pattern, see FIGS. 10a and 10b, over the length of the vacuum bars 9. When the cutting operation is completed, the vacuum bar assembly, which includes bars 9, cantilever arms 20 and hanging mounts 21, are moved over the blank 17 with a slight clearance. Simultaneously, the vacuum of the vacuum bars 9 is applied while the vacuum of the cutting table 18 is reversed. This insures a reliable and accurate release of the blank 17 from the cutting table 18 and a secure capture of the blank 17 by vacuum bars 9.

The blank 17 is than removed from the table and positioned in the punch press workstation 3. Again to insure proper positioning and registration in the punch station 3, the pick and place mechanism maintains a flattened and taut blank as it is introduced into the punch station 3. Once the blank 17 is engaged by the vacuum bars 9, it is held in position throughout further processing in the punch station 3.

The blank 17 is positioned on the work platform of the punch station 3 in registration with one end of the punch press by means of optical monitor 13 which senses and registers a lengthwise edge 38 of the blank 17, see FIG. 12. When optical monitor 13 indicates to controller 14 that one end of blank 17 is registered with, for example, left punch die set 11, controller 14 actuates the actuating mechanism 12 of left punch set 11 to clamp and punch the left end of blank 17. After one end is punched with the puzzle cut petals 31/32, the blank is released from the left punch set and shifted a predetermined distance to the right punch set 10 on vacuum bars 9 to cut the mating petals. The cutting process in punch set 10 establishes the final length of the blank 17. At each position, the location of the blank 17 is monitored by optical sensors 23 and 24 to insure continuous alignment of the blank 17 In relation to the punch sets. Left and right optical sensors 23,24 insure the continuity of alignment of the lengthwise edge of blank 17 in the punch station 3.

The process is computer controlled to properly sequence the positioning of the blank and the operations performed on the blank. After both ends are punched with the puzzle shaped cuts, the blank is picked up and rolled for transport to the station at which the ends are joined.

What is claimed is:

1. A method for precision cutting belt material for the formation of a puzzle cut joint in the construction of a continuous belt for use in document processing machines, comprising the steps of:

registering a belt material in operative position with a precision cutter;

securing said belt material in said operative position;

controlling said precision cutter to accurately cut said belt material to its final dimensions;

releasing said belt material and securing said belt material on a transport mechanism by means of a vacuum pickup;

transporting said belt material from said precision cutter to a punch press having first and second punch and die sets;

monitoring the position of said belt material relative to said first and second die sets and generating a signal relative thereto;

adjusting the position of the belt material relative to said first and second die sets for accurate registration therewith; and controlling the operation of said first and second punch and die sets in response to said position signals to cut mating shapes to form said puzzle cut joint.

2. A method for precision cutting belt material for the formation of a puzzle cut joint in the construction of a continuous belt for use in document processing machines, according to claim 1, wherein the step of registering is accomplished by sensing the position of the belt material and adjusting the position of the belt material in accurate registration with the precision cutter.

3. A method for precision cutting belt material for the formation of a puzzle cut joint in the construction of a continuous belt for use in document processing machines, according to claim 1, wherein the step of securing said belt material in operative position with said precision cutter is accomplished by applying a vacuum to said belt material through a supporting table.

4. A method for precision cutting belt material for the formation of a puzzle cut joint in the construction of a continuous belt for use in document processing machines, according to claim 3, wherein said application of vacuum is controlled by said process controller to secure the belt material in at least two steps, a first step in which the force exerted on said belt material is adjusted to allow limited movement of the belt material to adjust the position thereof relative to said precision cutter, and a second step in which the force exerted on said belt material prevents movement of the belt material with respect to said precision cutter.

5. A method for precision cutting belt material for the formation of a puzzle cut joint in the construction of a continuous belt for use in document processing machines, according to claim 3, wherein said vacuum pickup is controlled to engage the belt material after said belt material is cut and further wherein said source of vacuum for securing said belt material relative to said precision cutter is reversed as said source of vacuum for said vacuum pickup is applied.

6. A method for precision cutting belt material for the formation of a puzzle cut joint in the construction of a continuous belt for use in document processing machines, according to claim 1, wherein said vacuum pickup applies vacuum through a continuous slot to form a vacuum engagement of the belt material along a straight line.

7. A method for precision cutting belt material for the formation of a puzzle cut joint in the construction of a continuous belt for use in document processing machines, according to claim 1, further comprising the steps of:

transporting said belt material from said precision cutter to one of said first and second punch and die sets for cutting a mating portion of said puzzle cut joint on one end of said belt material; and then transporting said belt material to the other of said first and second punch and die sets for cutting another mating potion of said puzzle cut joint on another end of said belt material.

8. A method for precision cutting belt material for the formation of a puzzle cut joint in the construction of a continuous belt for use in document processing machines, according to claim 7, wherein the step of monitoring the position of said belt material relative to said punch and die sets is accomplished by positioning first and second optical sensors adjacent said first and second punch and die sets respectively.

9. A method for precision cutting belt material for the formation of a puzzle cut joint in the construction of a continuous belt for use in document processing machines, according to claim 8, wherein the step of monitoring the position of said belt material relative to said punch and die sets is accomplished at each location, by said first and second optical sensors and adjusted, if necessary, prior to the operation of said punch and die sets.

10. A method for precision cutting belt material for the formation of a puzzle cut joint in the construction of a continuous belt for use in document processing machines, according to claim 9, wherein said step of monitoring the position of said belt material relative to said punch and die sets includes positioning said first and second sensors to detect the position of a corner of said belt material relative to said respective punch and die set.

11. A method for precision cutting belt material for the formation of a puzzle cut joint in the construction of a continuous belt for use in document processing machines, according to claim 1, wherein the step of securing the belt material includes adjusting the position of said vacuum pickup to maintain the belt material in a tensioned condition during the operation of said punch press.

12. A method for precision cutting belt material for the formation of a puzzle cut joint in the construction of a continuous belt for use in document processing machines, according to claim 1, further comprising the step of pivoting the outer most vacuum bar out of the way of said respective punch and die sets, prior to actuation of the punch press.

* * * * *